(12) United States Patent
Kim et al.

(10) Patent No.: US 7,064,678 B2
(45) Date of Patent: Jun. 20, 2006

(54) WIRELESS TERMINAL FOR CHECKING THE AMOUNT USED OF GAUGE AND A GAUGE MANAGEMENT SYSTEM USING A WIRELESS COMMUNICATION NETWORK

(75) Inventors: Jae Min Kim, #103-701 Daejoo Apt., 249 Jinwall-dong, Nam-gu, Gwangju-shi (KR) 503-330; Tae Hoon Kim, Seoul (KR)

(73) Assignees: 2WG Co. LTD, Seoul (KR); Jae Min Kim, Gwangju-shi (KR)

( * ) Notice: Subject to any disclaimer, the term of this patent is extended or adjusted under 35 U.S.C. 154(b) by 492 days.

(21) Appl. No.: 10/048,654

(22) PCT Filed: Jun. 2, 2001

(86) PCT No.: PCT/KR01/00942

§ 371 (c)(1),
(2), (4) Date: May 10, 2002

(87) PCT Pub. No.: WO01/93224

PCT Pub. Date: Dec. 6, 2001

(65) Prior Publication Data

US 2002/0180615 A1    Dec. 5, 2002

(30) Foreign Application Priority Data

Jun. 2, 2000    (KR) ............................ 2000-30530

(51) Int. Cl.
 *G08C 17/00*    (2006.01)
(52) U.S. Cl. .................... 340/870.02; 379/106.06; 324/157
(58) Field of Classification Search ........... 340/870.02, 340/870.29, 870.07, 870.39, 870.03; 379/106.06, 379/93.07, 106.03, 106.08, 106.07; 324/157; 250/551
See application file for complete search history.

(56) References Cited

U.S. PATENT DOCUMENTS

| | | | | |
|---|---|---|---|---|
| 4,680,704 A | * | 7/1987 | Konicek et al. | ............ 382/100 |
| 4,811,011 A | * | 3/1989 | Sollinger | ............... 340/870.02 |
| 4,940,976 A | * | 7/1990 | Gastouniotis et al. | .. 340/870.02 |
| 5,673,331 A | | 9/1997 | Lewis et al. | |
| 5,852,658 A | * | 12/1998 | Knight et al. | .......... 379/106.03 |
| 5,870,140 A | | 2/1999 | Gillberry | |

FOREIGN PATENT DOCUMENTS

| | | |
|---|---|---|
| AU | 200115619 | 6/2001 |
| BE | 1013090 | 9/2001 |
| CN | 1048123 A | 12/1990 |
| DE | 196 45 656 | 5/1998 |
| JP | 61-208600 | 9/1986 |
| JP | 7-48239 | 5/1995 |
| JP | 10-21486 | 1/1998 |
| JP | 10-63976 | 3/1998 |

(Continued)

*Primary Examiner*—Michael Horabik
*Assistant Examiner*—Hung Q. Dang
(74) *Attorney, Agent, or Firm*—Merchant & Gould P.C.

(57) ABSTRACT

The present invention discloses a wireless terminal for checking the amount used of gauge and a gauge management system using a wireless communication network which checks the amount used of electricity, tap water, and gas by a wireless terminal. A wireless terminal established in a front of gauge, senses image of a figure at gauge, transmit data of the amount used with a wireless communication network. So, management of collecting rates of electricity, tap water, and gas are achieved easily.

4 Claims, 10 Drawing Sheets

FOREIGN PATENT DOCUMENTS

| | | |
|---|---|---|
| JP | 10-111326 | 4/1998 |
| KR | 20-0166476 | 10/1997 |
| KR | 1999-007879 | 2/1999 |
| KR | 20-0186926 | 4/2000 |
| KR | 20-0186926 | 6/2000 |
| KR | 1020010073329 | 8/2001 |

* cited by examiner

WIRELESS TERMINAL FOR CHECKING THE AMOUNT USED OF GAUGE AND A GAUGE MANAGEMENT SYSTEM USING A WIRELESS COMMUNICATION NETWORK

FIELD OF THE INVENTION

The present invention relates to a wireless terminal for reading meters and a meter-reading management system using wireless communication networks, and more particularly to the wireless terminal for reading the meter by sensing image data displayed on the meter and transmitting the data through a wireless communication network in a bi-directional manner and the meter-reading management system using wireless communication networks in which image on the meter representing the amount consumed for electricity, tap water, or gas is sensed by the wireless terminal and then is transmitted to a central station system so as to manage each individual charges for the amount consumed for electricity, tap water, or gas using a billing management system connected to the central station system.

BACKGROUND OF THE INVENTION

Conventionally, the amount consumed for electricity, tap water, or gas is measured by manually reading the meters settled in each accommodation including houses or buildings by meter-readers, converted into the corresponding rates to be charged in a respective office, and billed to each individual house or building.

It is general that meter-readings for such amount displayed on the meters are conducted by meter-readers, who visit each place of the meter and writes it down on a check board after read it by a sight. Therefore, the conventional method for meter-reading works has several problems such that it needs many human resources, and has an inefficiency as well as an inaccuracy due to manual records.

BRIEF DESCRIPTION OF THE DRAWINGS

Referring now to the drawings.

DETAILED DESCRIPTION OF THE INVENTION

It is an object of the present invention to remotely manage the meter-reading works for the amount of electricity, tap water, or gas consumed for each accommodation by detecting images displayed on each meter to convert them into digital data, transmitting them to a remote billing management system, and calculating the rates to be charged at the remote billing management system.

It is another object of the present invention to substantially implement a remote meter-reading management using a wireless communication network just by installing the wireless terminal for sensing the image on the meter showing the consumed amount of electricity, tap water, or gas, without modifying the meters previously mounted.

It is still another object of the present invention to substantially implement a remote real-time inspection for the state of the wireless terminal or the meter by occasionally calling it through a wireless communication network.

It is still another object of the present invention to implement an efficient maintenance of the wireless terminal by detecting power-off state of the wireless terminal, notifying it to a control host through a wireless communication network, and simultaneously supplying supplemental power from a auxiliary battery.

In order to accomplish the aforementioned objects, the present invention may have a wireless terminal for meter-reading, comprising a jointing member formed on the base of a case for combining the wireless terminal with a meter; a power supply section for supplying power to each component; a data transceiver section for receiving meter-reading command and transmitting the read data by communicating with a wireless communication network in a bi-directional manner; a slave controller for decoding/encoding the data to/from the transceiver section; an image sensor for generating digital information about the amount of the meter by sensing the image on the meter and compressing the sensed data; a memory for storing temporary data or a program for operation; a master controller for controlling the data transceiver section, for driving the image sensor in response to the meter-reading command decoded by the slave controller, and for controlling the digital information of the consumed amount provided from the image sensor to be temporarily stored in the memory and to be output after encoded by the slave controller.

Herein, the power supply section may be constituted so as to supply DC power to each component by using AC power source or a rechargeable battery, or may comprise a circuit for detecting power failures or abnormal state of the battery.

In addition, the image sensor may be constituted so as to carry out the first compression for composing image data with a bit of data representing bright and dark states by pixels, the second compression for reducing the size of the image by determining and eliminating unnecessary regions, and the third compression for converting the image data into binary data corresponding to decimal numbers.

A meter-reading management system using a wireless communication network according to the present invention may comprise: the wireless communication network; a central station system for sending a meter-reading command and for receiving the read data; a billing management system for calculating the rate to be charged according to the read data received from the central station system; and a wireless terminal, including a jointing member formed on the base of a case to combine the wireless terminal with the meter, and is constituted so as to image-sense the consumed amount on the meter in response to the meter-reading command supplied through the wireless communication network, to generate the meter-reading data in accordance with the image sensing, and to send the meter-reading data through the wireless communication network.

PREFERRED EMBODIMENTS

Figure 1:
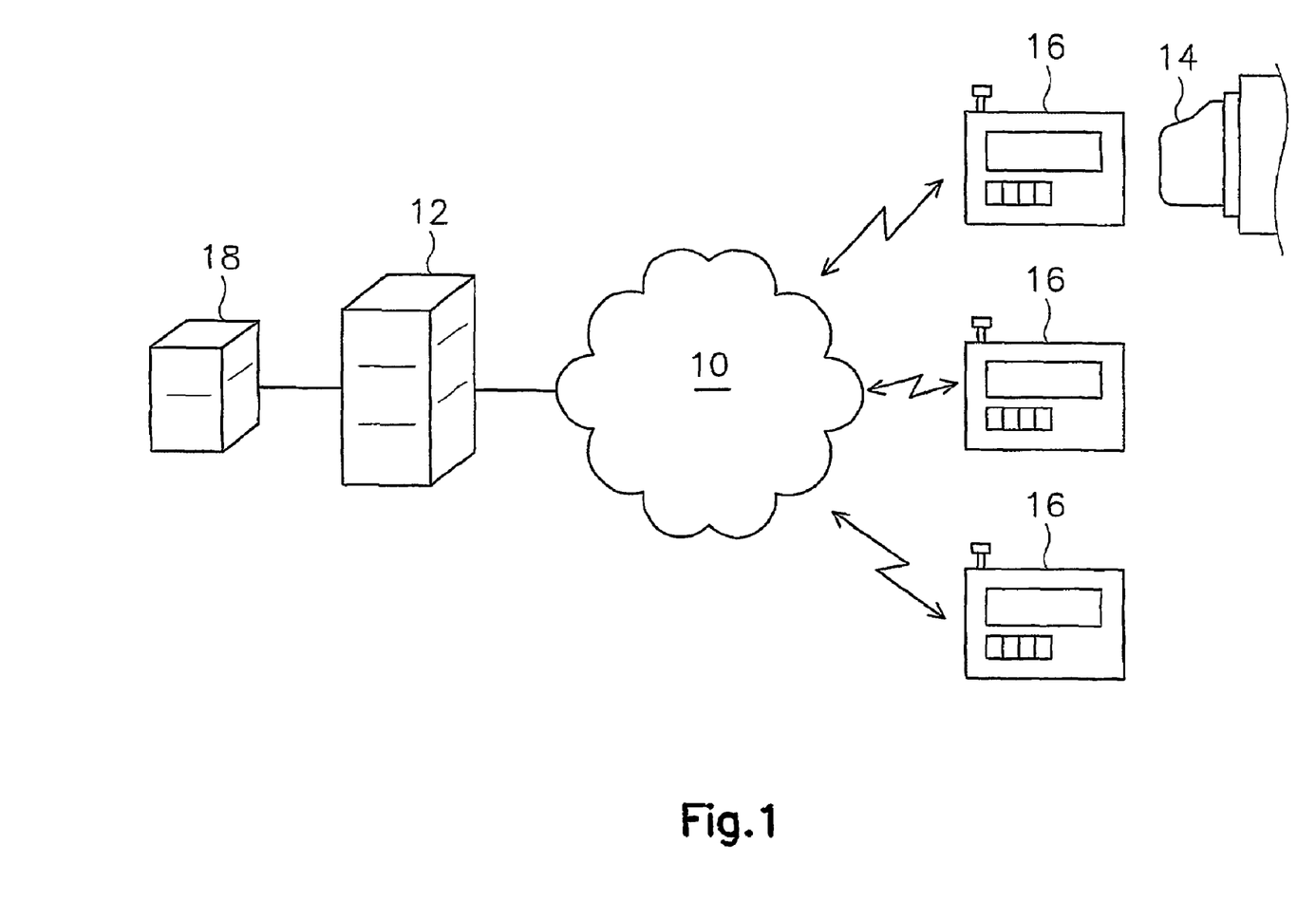
FIG. 1 illustrates a system for implementing the teachings of the present disclosure.

Referring to FIG. 1 showing a preferred embodiment according to the present invention, a central station system 12 is connected to a wireless communication network 10 by way of one of the base stations (not shown), wherein the wireless communication system comprises wireless provisions such as base stations, radio towers, and so on (not shown), to assist a bi-directional communication between the central station system 12 and a wireless terminal 16 for transmitting the meter-reading data.

The central station system 12 can be associated with a number of sub-systems such as a voice mailing system (VMS; not shown) for managing voice mails, a service management system (SMS; not shown) for performing a service for a remote control and a process for call data, an internet gateway system(IGS; not shown) for processing web mail messages, and a billing management system (BMS) 18, in order to totally control the connections between the wireless communication system 10 and the sub-systems. For example, only the billing management system 18 may be assigned to the central station system 12 as shown in FIG. 1.

FIG. 1 shows the meter 14 is installed on each accommodation such as a house or a building in order to measure the amount consumed for tap water, electricity or gas, and the wireless terminal 16 is installed on the meters.

The wireless terminal 16 image-senses a measured value (e.g., "00583 kwh" for electricity), converts it into data, and then transmits it to the central station system 12 through the wireless communication network 10. For those functions, the wireless terminal 16 has a easily removable/installable configuration to perform an image sensing by covering a whole surface of the meter 14 as shown in FIG. 2, while has the internal block diagram for the image sensing and data transmission as shown in FIG. 3.

Generally, the meter 14 has a panel exposed to person's sight in order to allow us to see the metered value, and the wireless terminal 16 can be constituted to cover a top face of the meter 14 in order to sense the image displayed on the panel.

Figure 2:
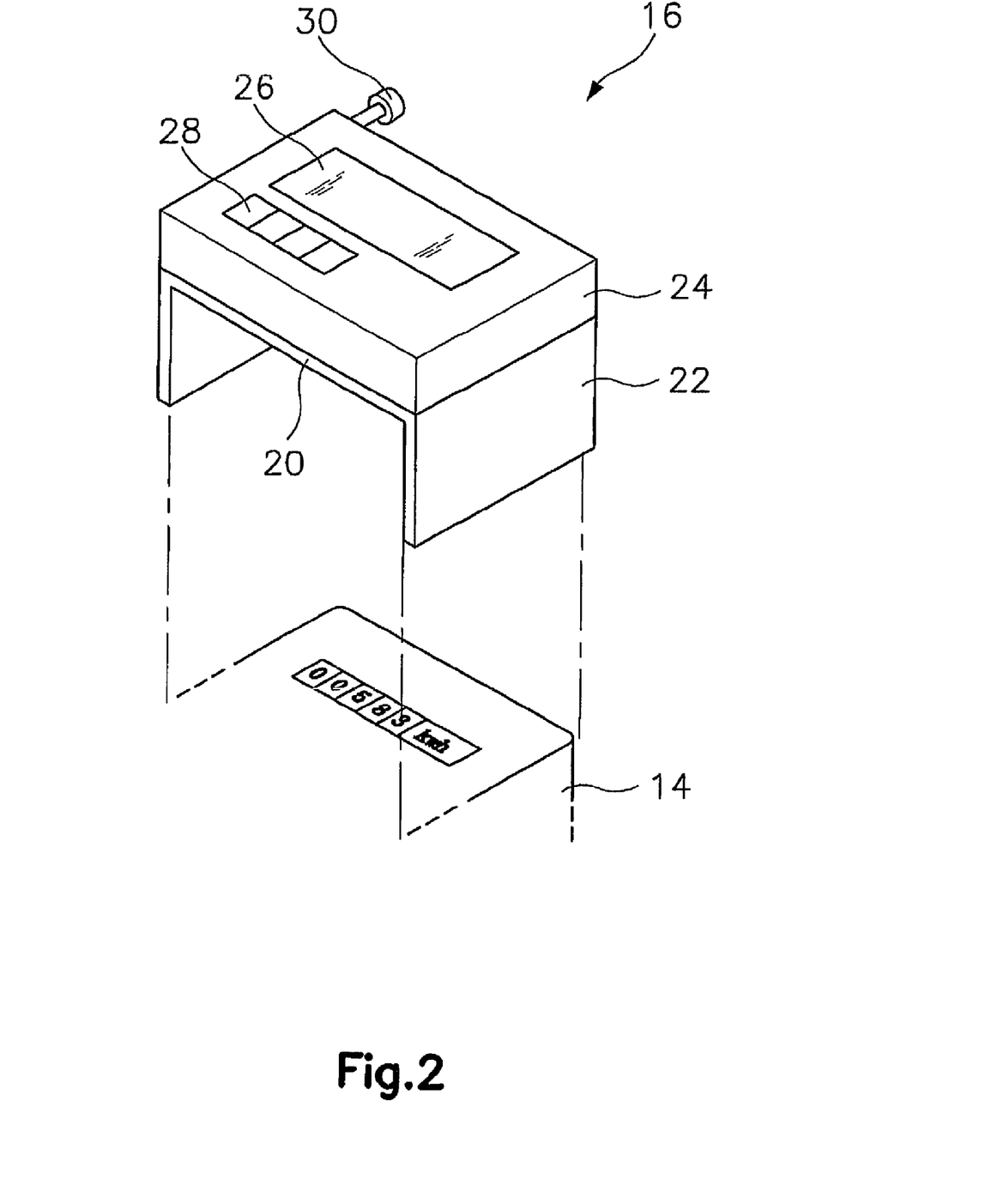
FIG. 2 illustrates an example embodiment of a wireless terminal.
Figure 3:
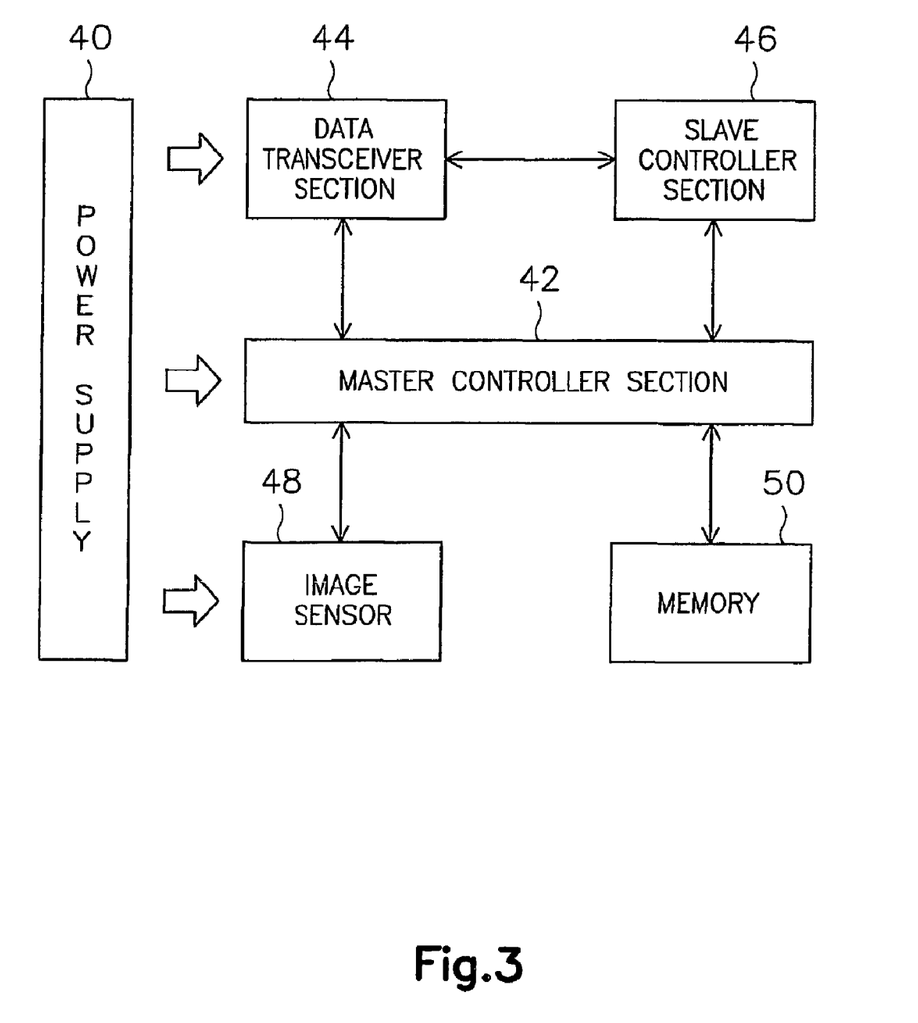
FIG. 3 illustrates an example internal block diagram for image sensing in data transmission according to one embodiment of the present disclosure.

That is, as shown in FIG. 2, the wireless terminal 16 comprises a combination of a base 20 and a case 24. The base 20 has a fixing board perpendicular to both ends of the longitudinal side facing the meter 14. The case 24 is composed of a window 26, a solar panel 28, and an antenna 30. Here, the window 26 may be made of transparent glass or compound resin so as to allow us to read the values on the meter 14, or be constituted to display a digitized value which is being read by a image sensor. While the solar panel 28 for supplying an operational power by gathering external light may be constituted, another power source for the wireless terminal 16 can be prepared by using a battery instead of the solar panel 28. Further, another method for supplying power can be constituted by adopting all of the above two method in parallel, or by extracting a power line supplied to the meter 14.

Hereafter, the internal configuration of the wireless terminal 16 will be described referring to FIG. 3.

The wireless terminal 16 has a power supply section 40 for supplying power into each component. The power supply section 40, as aforementioned, may be formed to supply DC power by using the current generated by the light-gathering of the solar panel 28, by using a battery, or by converting AC power supplied to the meter 14 into DC power. It would be appreciated by those skilled in the art that modification or variation for those configuration of the power supply section 40 can be employed in various manner in order to supply DC power to each component in accordance with appropriate intentions by a manufacturer.

The wireless terminal 16 comprises a master controller 42, a data transceiver section 44, a slave controller 46, an image sensor 48, and a memory 50.

Here, the data transceiver section 44 is constituted to perform bi-directional transmitting/receiving operations through the wireless communication network 10 by controlling the master controller 42.

The slave controller 46 is constituted to process the data to transmit/receive it to/from the data transceiver 44, and the received/transferred data are output/input to/from the master controller 42.

The image sensor 48 comprises a pixel array (not shown) for sensing the image on the meter 14 by converting the optical data into analogue electrical signal and a analogue-digital converter (not shown) for converting the analogue signal into a digital signal and for outputting a compressed digital signal to the master controller 42.

The memory 50 is constituted so as to store a program for controlling operations and temporary data for processing the image, by controlling the master controller 42.

The master controller 42 is constituted to control all operations of each component, such as image-sensing, data transmitting, and data receiving.

Figure 4:
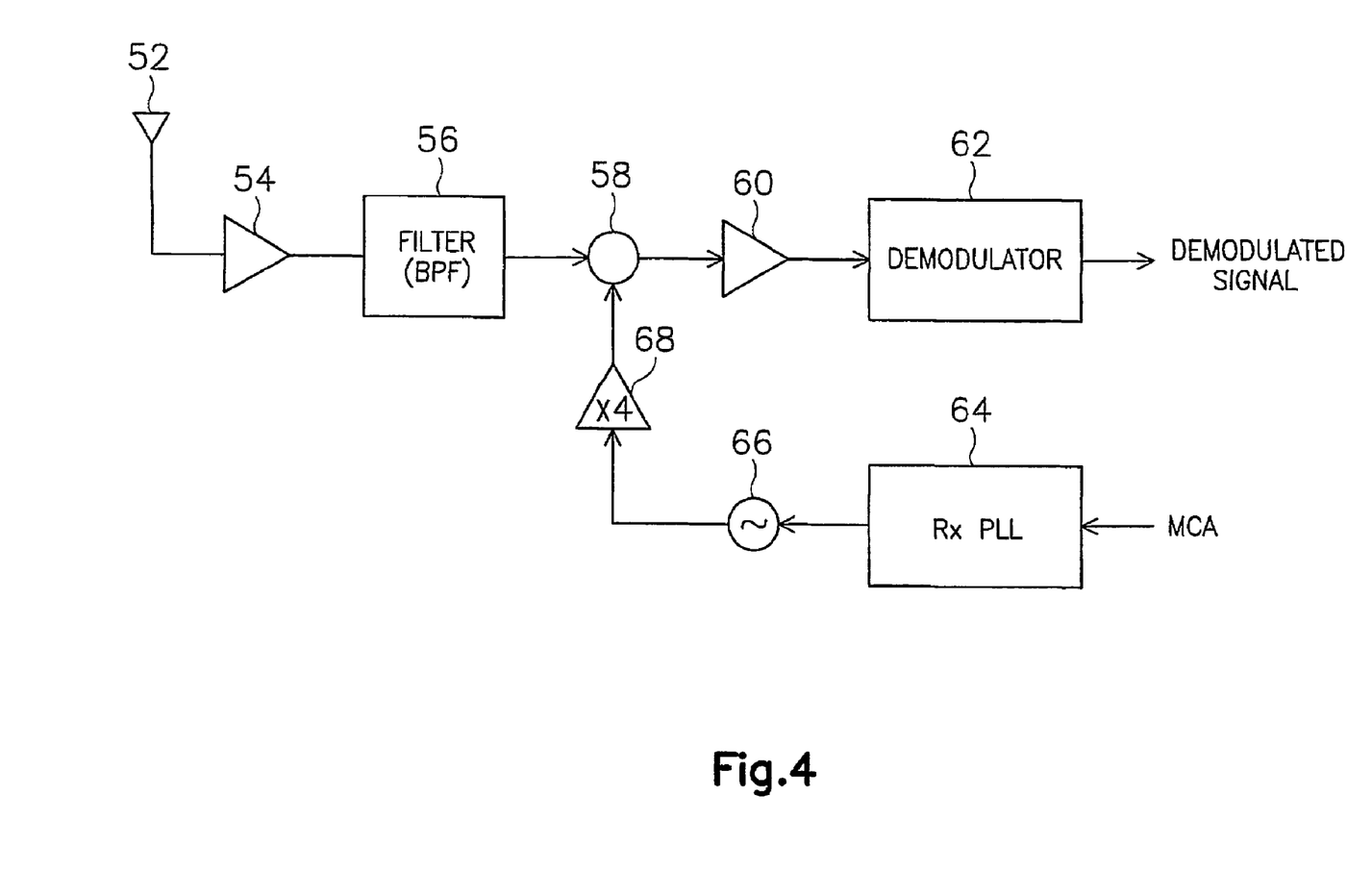
FIG. 4 illustrates an example data transmission circuit for filtering a signal according to one embodiment of the present disclosure.
Figure 5:
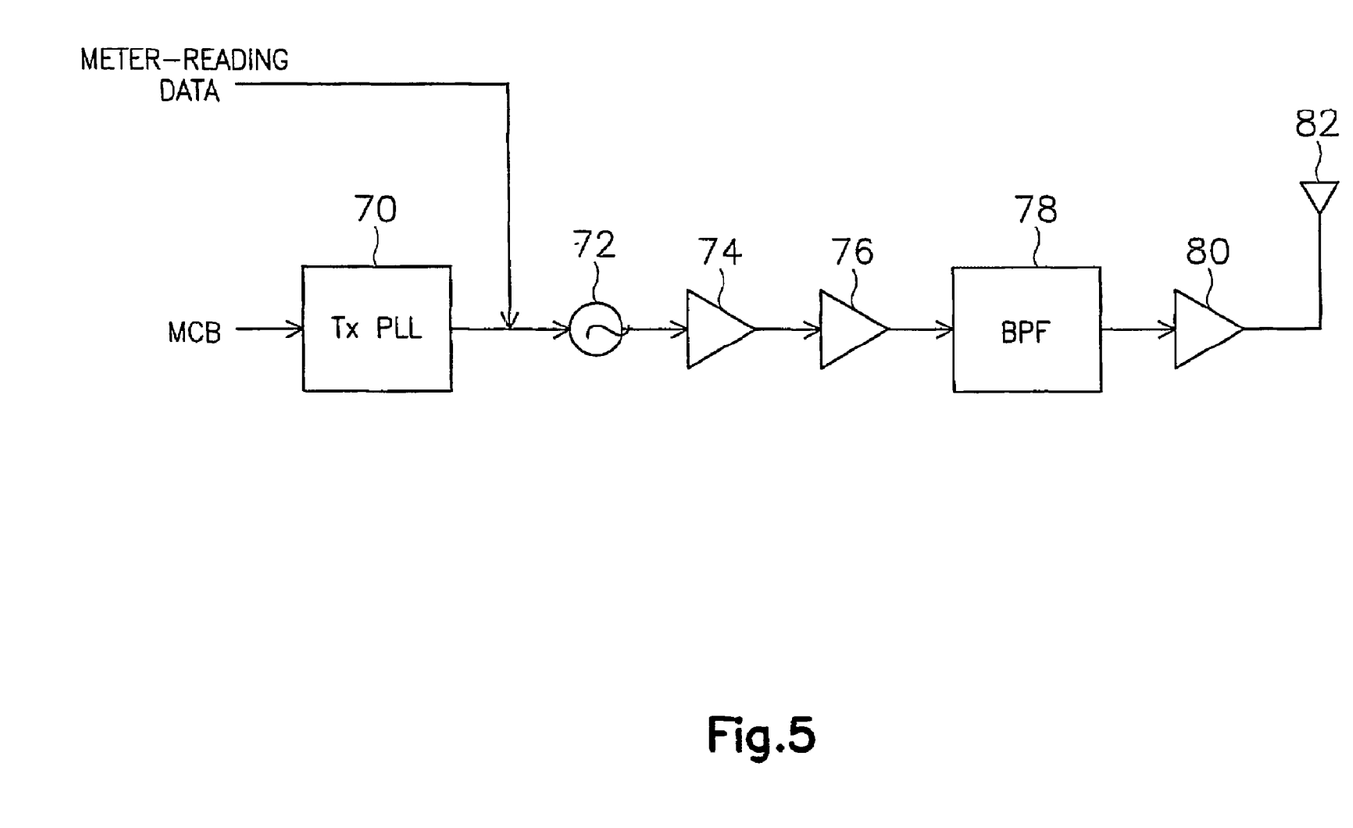
FIG. 5 illustrates an example data transmission circuit for generating a carrier signal according to one embodiment of the present disclosure.

Here, the data transceiver section 44 includes a data transmission circuit and a data receipt circuit, and the data receipt circuit is constituted as shown in FIG. 4 while the data transmission circuit is constituted as shown in FIG. 5.

As shown in FIG. 4, the data receipt circuit belonging to the data transceiver section 44 is constituted to filter a signal containing minute current values received through the antenna 52 through a filter 56 by way of an amplifier 54. Here, as a signal with a frequency of 300 MHz is introduced therein, the filter 56 passes a corresponding bandwidth through a saw filter as a band pass filter while blocks other bandwidths. Thus, a signal located in a specific bandwidth is applied to a mixer 58.

The mixer 58 is constituted to output an intermediate frequency signal to an amplifier 60, and a demodulator 62 is constituted to demodulate the intermediate frequency signal amplified by the amplifier 60 into a digital signal and to output a final signal to the slave controller 46.

At this time, the mixer 58 receives a mixing signal to eliminate a carrier and to output the intermediate frequency signal. The mixing signal is generated by a receiver phase locked loop (Rx PLL) 64, a VCO 66, and a multiplier 68, and then provided to the mixer 58. Here, the Rx PLL 64 is controlled by a control signal MCA of the master controller 42.

Meanwhile, the data transmitting circuit included in the data transceiver section 44 comprises transmitter phase locked loop (Tx PLL) 70 for generating a carrier signal by applying the control signal MCB from the master controller 42, and is constituted to allow the carrier signal and the meter-reading data encoded by the slave controller 46 to be applied to a VCO 72. An input terminal of the VCO 72 preferably comprises a varacter device for determining a modulation width of the data for transmission. The VCO 72 is constituted to generate a signal by modulating meter-reading data to the carrier signal, and the multiplier 74 is constituted to convert an output signal of the VCO 72 into a signal having the frequency multiplied by 3(about 900 MHz). The multiplier 74 is constituted to output a multiplied signal to an amplifier 76, and a band pass filter 78 is constituted to suppress the noises included in an amplified signal and the signals belonging to an undesirable bandwidth. A power amplifier 80 is constituted to amplify the strength of the signal power enough to finally arrive at a relay station and then to transmit it through the antenna 82.

Figure 6:
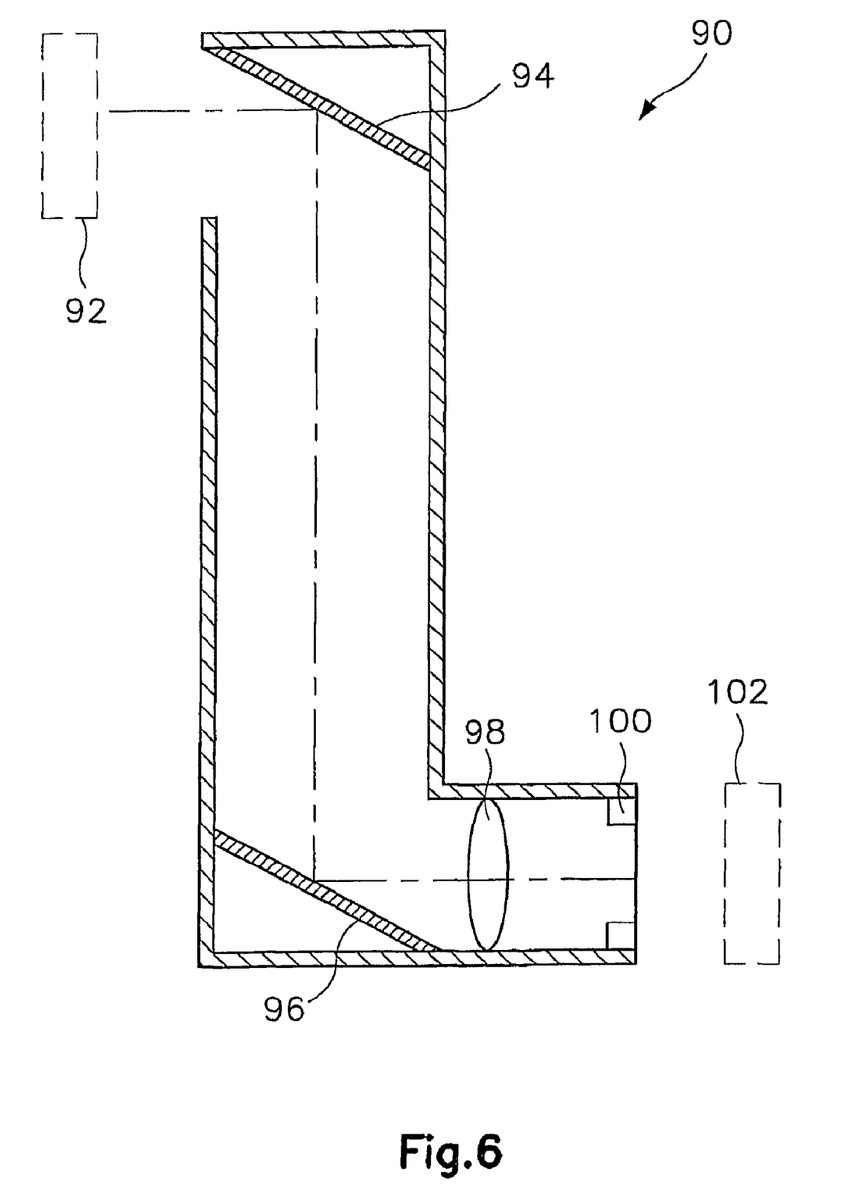
FIG. 6 illustrates an example reflection box according to one embodiment of the present disclosure.

The wireless terminal constituted as aforementioned may be associated with a reflection box 94 shown in FIG. 6, in order to accord the position of the panel of the meter 14 to the position where the image sensor 48 is fixed because it is occasional to happen a misalignment between two positions.

The reflection box 94 includes an inlet into which an image enters, an outlet from which the image is applied to the image sensor, and a reflection path to transfer the image from the inlet to the outlet. An entrance mirror 94 is installed at the inlet with a predetermined angle so as to reflect the image in parallel along the path, and an exit mirror is installed at the outlet with a predetermined angle so as to reflect the image transferred through the reflection path. Between the exit mirror 96 and the image sensor 102, a lens 98 can be interposed. The lens 98 focuses the image reflected from the exit mirror 96 on the image sensor 102. Additionally, in order to obtain constant illumination of the image on the sensor (102), a lamp 100 may be preferably installed between the image sensor 102 and the lens 98 of the outlet.

By constituting the embodiment of a meter-reading management system with a wireless communication network according to the present invention as aforementioned, it is possible to accomplish a meter-reading using the wireless terminal 16.

The meter-reading using the wireless terminal 16 can be started by the master controller's 42 receiving the meter-reading command from the central station system 12.

The central station system 12 searches current calls and maintains synchronization with that, and then demands a point call to confirm a location of the wireless terminal 16. If the wireless terminal 16 performs a channel assignment to response the location confirmation, the central station system 12 determines whether or nor the assigned channel is BUSY, and transfers the determination result to the wireless terminal 16. The wireless terminal 16 transfers a response in order to register its location to the central station system 12, and the central station system 12 transfers the meter-reading command through the call channel.

According to aforementioned operations, when the meter-reading command is transmitted from the central station system 12, the master controller 42 receives the meter-reading command which is amplified, filtered, intermediate frequency mixed, and demodulated by the data receipt circuit in FIG. 3 belonging to the data transceiver section 44.

Subsequently, the master controller 42 controls the image sensor 48 to read the consumed amount displayed on the panel of the meter 14. Further, the data sensed by the image sensor 48 is compressed and then stored in the memory 50.

Specifically, if the decimal number displayed on the panel of the meter 14 is "00583", the image sensor 48 reads the numbers one by one.

That is, the numbers are read in the order of "0", "0", "5", "8", and "3".

Figure 7A:
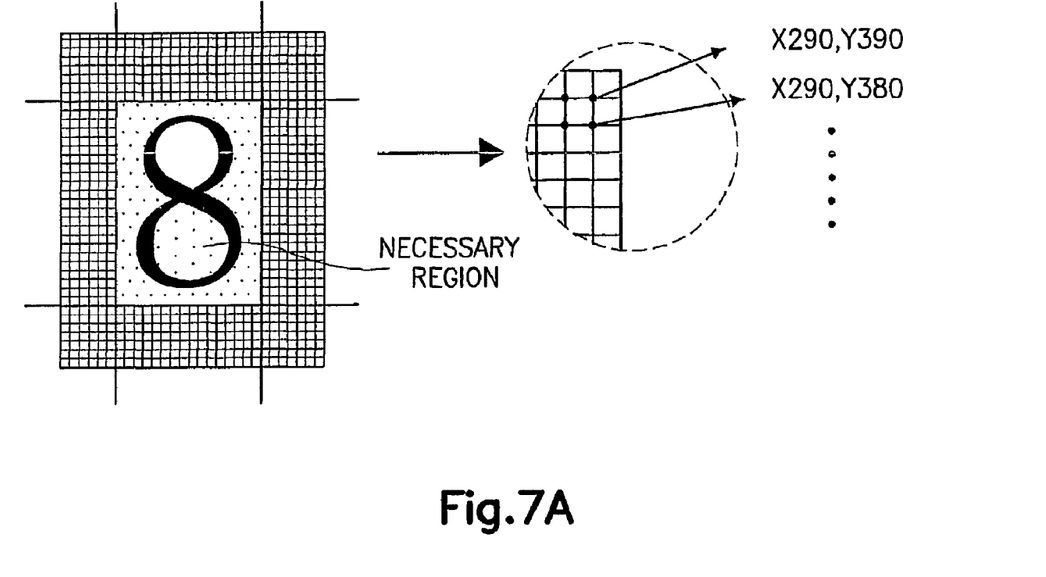
FIG. 7A illustrate image data indicating a decimal number according to one embodiment of the present disclosure.

As a result, each numerical value read from the panel of the meter 14 covers a wide area as shown in FIG. 7*a*. At this time, the first data compression is carried out.

Specifically, the image sensor 48 has a constant number of pixels (e.g., 300×400), and converts the light signal received in the form of different levels into an analogue electrical signal in accordance with the light incident on each optical-electronic means(not shown) pixel by pixel. In addition, the analogue electrical signal is converted into a digital signal representing "0" or "1" by an analogue-digital converter employed in the image sensor 48 in accordance with the brightness.

While a common image sensor process the brightness data with 256 gradients in the form of 8-bit data, the present image sensor 48 further compresses the 8-bit data to 1-bit data. Thus, the image sensor 48 obtains first-compressed image data with the capacity of 15 Kbyte which is one-eighth of the 120 Kbyte generated in the form of 8-bit data by pixel.

Figure 7B:
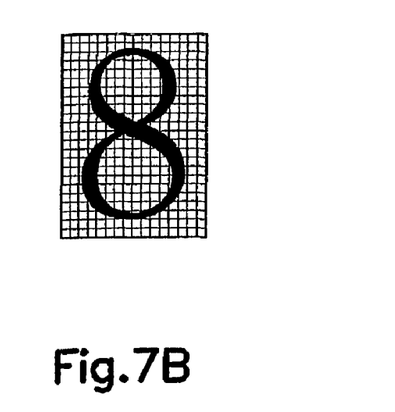
FIG. 7B illustrates a reduced image resulting from compression of the image data shown in FIG. 7A.

However, the 15 Kbyte is still too much to be treated in the environment of wireless communication. Therefore, the size of the image is shrunken to the necessary area to identify a character by the analogue-digital converter employed in the image sensor 48, and the image of FIG. 7*a* is reduced to that of FIG. 7*b*. That is, the second compression for the image data is to eliminate unnecessary areas.

For the above second compression, the image-sensed area is divided by X- and Y-axes to allow each pixel to have the position value in the coordinate system, and then unnecessary areas where there is no character data sensed are removed to a maximum.

Figure 7C:
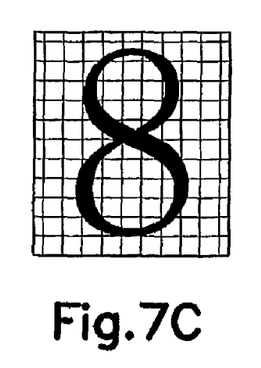
FIG. 7C-7E illustrate images resulting from pattern recognition compression techniques.
Figure 7D:
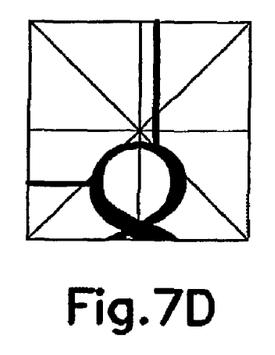
Figure 7E:
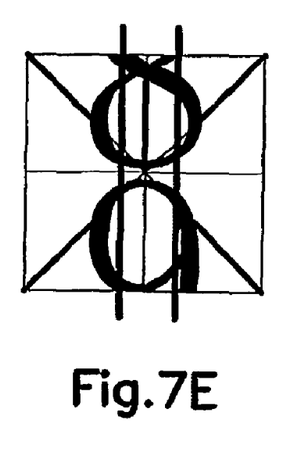

As the size of the image data is still large even after completing the second compression, the analogue-digital converter of the image sensor 48 conducts the third compression by means of a statistical feature extraction as one of the pattern recognition method as shown in FIGS. 7*c* through 7*e*.

For example, as shown in FIG. 7*c*, an image can be segmented into the same areas with rows and columns, and the number of black pixels for each area is evaluated. Accordingly, assuming that an image is divided into 8-row×8-column, the image can be abstracted to a vector of 64 dimensions.

For another example, as shown in FIG. 7*d*, the features of the image can be extracted by scanning in the directions of row and column in the manner of circumferential feature extraction. That is, the run length of white pixels is calculated until the first black pixel meets for each scanning line, and the calculated run lengths are accumulated and normalized.

For still another example, as shown in FIG. 7*e*, features of the character can be recognized in the manner of cross-number feature extraction in which the number of cross is scanned and accumulated along several vertical lines, the accumulated values are normalized by the number of scanning lines, and, particularly, features on the upper and lower intersections is extracted by scanning along the horizontal direction not the vertical direction.

Besides the methods shown in FIGS. 7*c* through 7*e*, it is available to adopt another methods for extracting features such as contour length method, pixel connection method, or Fourier analysis method.

The data obtained from the method shown in FIGS. 7*c* through 7*e* is compared with a reference data stored previously. If the obtained data is similar to the reference data 90 through 95 percentages or over, the obtained data is regarded as a valid data. Provided comparison result corresponds to a value "8", the image data is converted into a 4-bit binary data that is "1000" corresponding to the decimal data "8". Thus, the image sensor 48 provides the binary data "1000"to the master controller 42 when a numerical value on the meter 14 is "8", and then the master controller 42 makes the binary data be stored in the memory 50.

As aforementioned, if the consumed amount of the meter 14 is identified by performing the operations of image-sensing, compressing, and storing the data, the master controller 42 transmits the read data to the slave controller 46 which provides an encoded meter-reading data to the data transceiver section 44.

Subsequently, the data transceiver section 44 mixes the read data with a carrier generated from the transmitter PLL 70 in response to the control signal MCB of the master controller, and transmits the data signal amplified and filtered from the mixed signal through the antenna 82.

The data received by the antenna 82 through the wireless communication network 10 is applied to central station system 12, which delivers the received data to the billing management system 18 and sends the message informing of a safe receipt of data to the wireless terminal 16. After the wireless terminal 16 transmits the read data, it waits to receive the safe receipt message, and returns to the stand-by mode as soon as receives the safe receipt message. Meanwhile, the billing management system 18 calculates and manages the rate to be charged for each meter-reading data arrived thereat.

It would be appreciated by those skilled in the art that the aforementioned preferred embodiments can be varied or modified to employ various kinds of image sensing method, e.g., scanner method, photographing method, motion detection method using a timer, or roller method.

In addition, through an electronic mail of an on-line method as well as a postal service of an off-line method, a notice of charges for the amount consumed for electricity, tap water, or gas can be issued by the billing management system 18 using various kinds of systems associated with the central station system 12 as subsystems.

Figure 8:
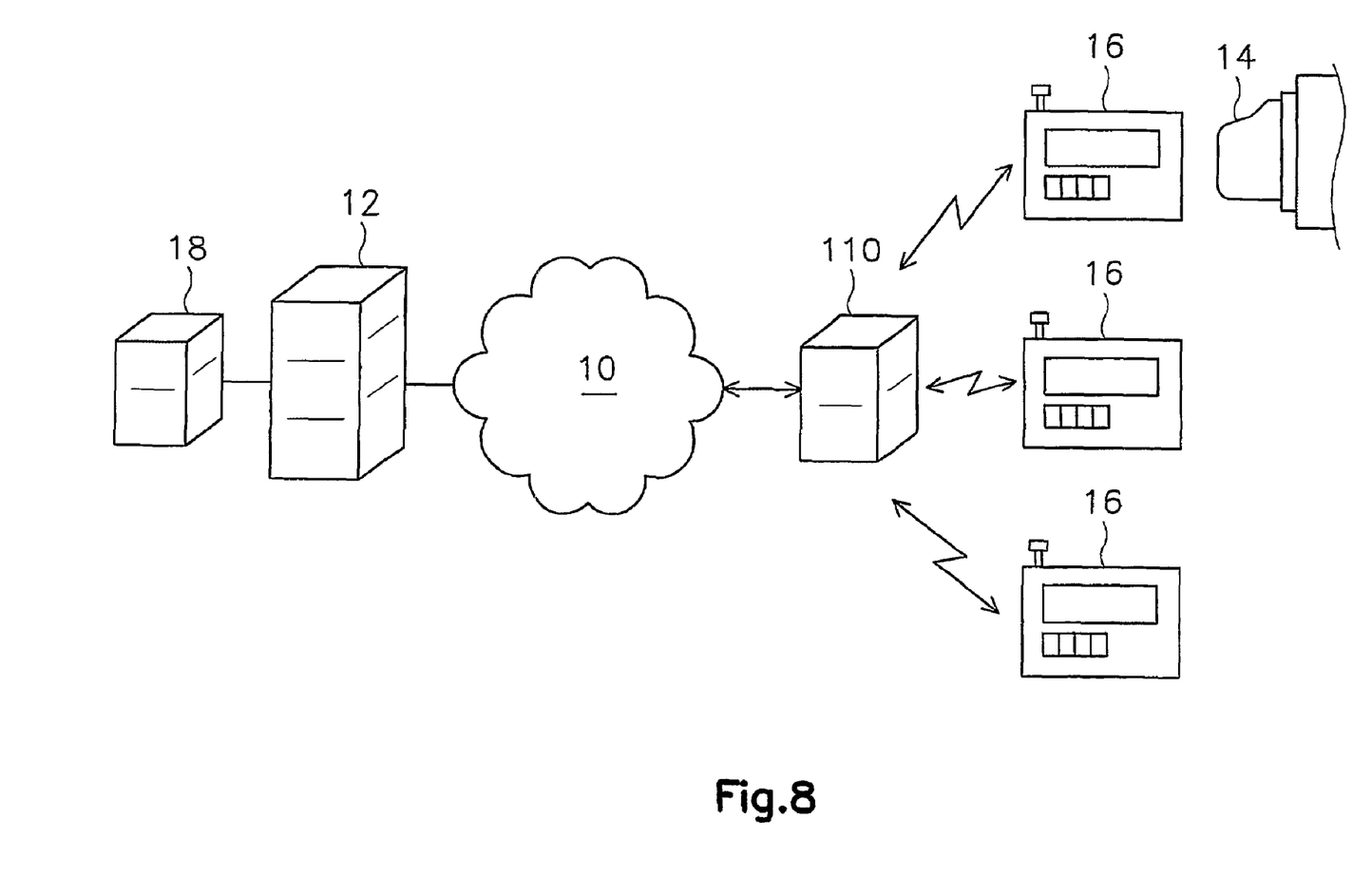
FIG. 8 illustrates another example system for implementing the teachings of the present disclosure.

In the meantime, as shown in FIG. 8, it is possible to include a relay station 110 between the wireless communication network 10 and the wireless terminals 16, which is applicable to the environment that a home-LAN or Bluetooth integrates and controls a plurality of the wireless terminal 16 for measuring the amount consumed for electricity, tap water, and gas, through the relay station 110.

Figure 9:
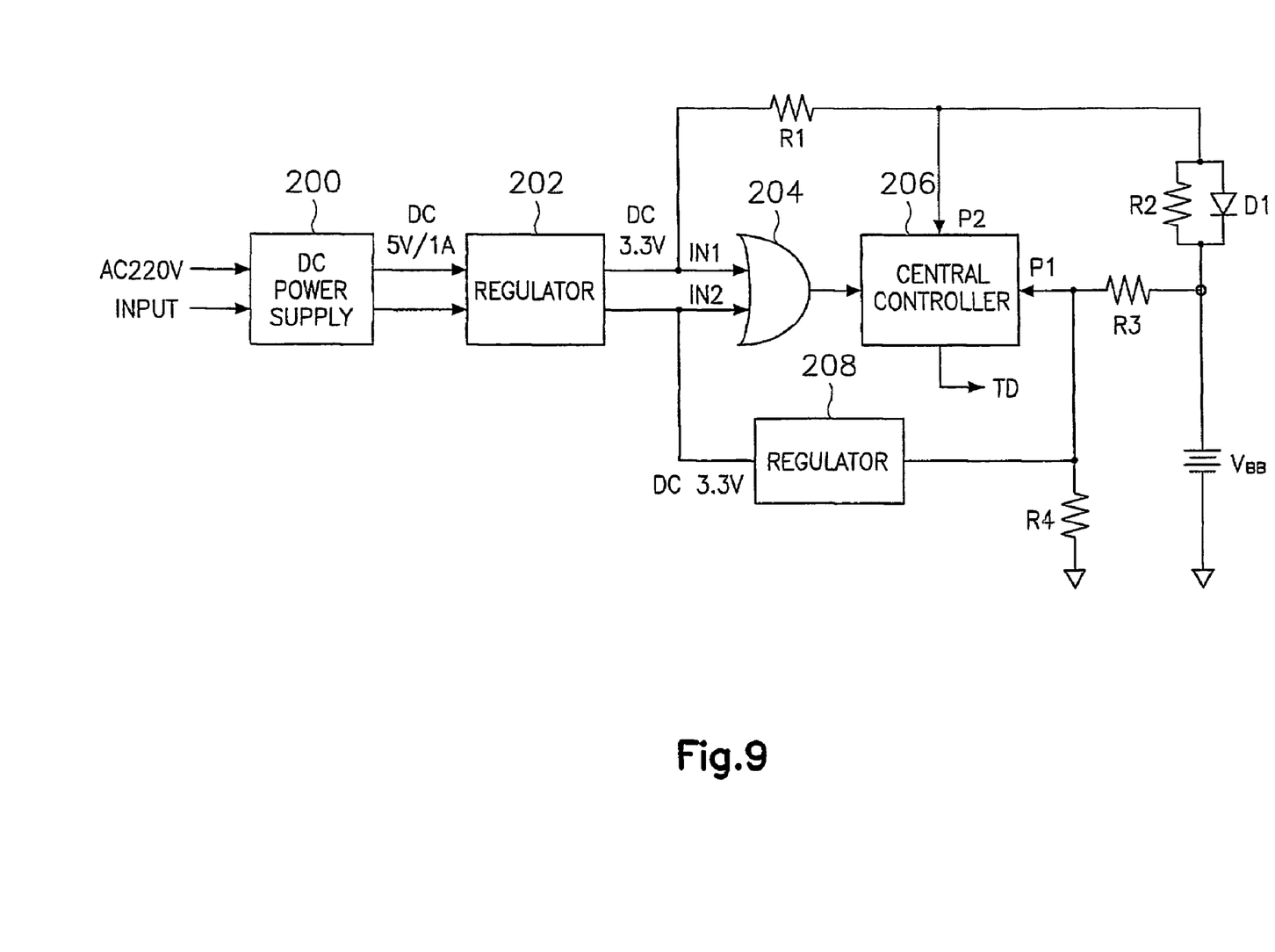
FIG. 9 illustrates a circuit block diagram for implementing the teachings of the present disclosure.

According to another embodiment of the present invention, additional circuits for coping with power-off failure can be included between the master controller and the power supply section as shown in FIG. 9.

FIG. 9 shows the embodiment that an adapter supplies power, wherein a central controller 206 corresponds to the master controller in FIG. 3 and the others corresponds to the power supply section in FIG. 3. VBB is a rechargeable battery.

In detail, it comprises a DC power supply 200 for converting AC power of 220V into DC power of 5V, including a rectifier (not shown) for converting AC to DC, a transformer(not shown) for modifying a voltage level, and a smoothing circuit(not shown) for smoothing a signal wave. A regulator 202 is constituted to convert the output of the DC power supply 200 into a voltage of 3.3V that substantially required by the wireless terminal, and two outputs from the regulator 220 are applied to 2 input terminals IN1 and IN2 of an OR gate 204.

The OR gate 204 is constituted to provide a voltage of a high level to the central controller 206 when either one of 2 input terminals IN1 or IN2 is high.

Meanwhile, the output of the regulator 202 which is applied to the input terminal IN1 of the OR gate 204 is connected to the rechargeable battery VBB through a resistor R1 connected to the output in parallel, and a resistor R2 and a diode D1 which are connected from each other in parallel. The rechargeable battery VBB is charged by the current passing through the path from the output of the regulator 202. The voltage applied to the resistor R1 is also provided to a port P1 of the central controller 206 and thereby the central controller 206 detects power failure. The resistor R1 also has a function to prevent an inflow of excess current.

In addition, a resistor R3 is connected to a port P1 of the central controller 206 in order to sense the current supplied to the rechargeable battery VBB, and a resistor R4 is connected to the resistor R3 in parallel. The resistor R4 is connected to a regulator 208 which provides a DC voltage of 3.3V to the input terminal IN2 of the OR gate 204 by the rechargeable battery VBB. The central controller 206 detects a charge status of the rechargeable battery VBB through the port P1, and the resistor R3 also has a function to prevent an inflow of excess current. The resistor R4 stabilizes a voltage level supplied to the regulator 208, and prevents damages of the central controller 206 and the regulator 208 by dividing current when the rechargeable battery fails or the circuits are shorted.

According to the aforementioned constitution of a power supply, when a power is normally supplied from the DC power supply in a stable state, voltage of high levels is applied to the input terminals IN1 or IN2 of the OR gate 204, and the rechargeable battery VBB is charged by the current passing through the path of the resistors R1 and R2, and the diode D1. Therefore, as the high-level voltages are applied to the input terminal IN1 or IN2 of the OR gate 204, a high-level voltage for operating the central controller 206 can be supplied.

By the contrary, if power failure occurs, the regulator 202 applies low-level voltages to the input terminals IN1 or IN2 of the OR gate 204. However, as a high-level voltage is applied to the input terminal IN2 of the OR gate 204 from the regulator 208 by the rechargeable battery VBB, the OR gate 204 supplies a high-level voltage to operate the central controller 206.

On the other hand, if the central controller 206 detects a presence of a power failure by sensing a signal applied to the port P2, the central controller 206 outputs the power failure information signal as a signal TD, which is transferred to the central station system through the data transceiver section after encoded by the slave controller.

Further, if the central controller 206 detects an abnormal state in charging and operating the rechargeable battery by sensing a signal applied to the port P1, the central controller 206 outputs the abnormal battery status information signal as a signal TD, which is transferred to the central station system through the transceiver section after encoded by the slave controller.

As described above, by employing the circuit shown in FIG. 9, it is possible to operate the wireless terminal with a stable state even during a power failure. By transmitting information about a power failure or an abnormal battery condition to the central station system through a wireless communication, it is possible to totally manage operational status of the wireless terminals.

Regarding the current consumed in transmitting and receiving data, it is preferable to adopt the rechargeable battery with a high capacity.

INDUSTRIAL AVAILABILITY

According to the present invention, since there is no need to visit each accommodation to check out the amount consumed for electricity, tap water, and gas, it is possible to reduce human resources for meter-reading works.

Further, since existing manual meter-reading works can be substituted with a remote management using image sensing, it is possible to enhance work performance and to ensure reliability of the data.

Moreover, since easily installable/removable wireless terminal can be employed, it is possible to use existing meters without modifications.

Moreover, since the current status of the meters such as power failure or an abnormal battery condition can be remotely detected, it is possible to ensure efficiency of the system maintenance.

What is claimed is:

1. A wireless terminal for reading a meter, comprising:
    a jointing member formed on the base of a case for combining the wireless terminal with the meter;
    a power supply section for supplying power to each component, wherein the power supply section is constituted so as to supply DC power to each component by using an AC power source or a rechargeable battery, wherein the power supply section includes:
    DC power supply means for converting AC power into a DC voltage of a specific level;
    a circuit for charging the rechargeable battery with power output from the DC power supply means;
    voltage output means for outputting a voltage for a normal operation when either one of voltages supplied from the DC power supply means or the rechargeable battery is normal;
    a circuit for charging the rechargeable battery with the power output from the DC power supply means; and
    charging voltage output means for outputting the power of the rechargeable battery to the means for determining power failure;
    a data transceiver section for receiving a meter-reading command and transmitting the read data by communicating with a wireless communication network in a bi-directional manner;
    a slave controller section for decoding/encoding the data to/from the data transceiver section;
    an image sensor for generating digital information of the consumed amount by sensing the image on the meter and by compressing the sensed data;
    a memory for storing temporary data or a program for operation; and
    a master controller section for controlling the data transceiver section, for driving the image sensor in response to the meter-reading command decoded from the slave controller section, and for controlling the digital information of the consumed amount provided from the image sensor to be temporarily stored in the memory and to be output after encoded by the slave controller section.

2. The wireless terminal according to claim 1, wherein the master controller section is constituted so as to detect the current passing through the circuit for charging in order to determine if power failure occurs, and to output the determined information through the slave controller section.

3. The wireless terminal according to claim 1, wherein the master controller section is constituted so as to detect the output of the rechargeable battery in order to determine if the rechargeable battery is short-circuited, and to output the determined information through the slave controller section.

4. The wireless terminal according to claim 1, wherein the image sensor is constituted so as to carry out a first compression for composing image data with a bit of data representing bright and dark states by pixels, a second compression for reducing the size of the image data by eliminating unnecessary regions, and a third compression for converting the image data into binary data corresponding to a decimal number.

* * * * *